W. E. CHESTER.
DENTAL DRILLING TOOL.
APPLICATION FILED JUNE 27, 1917.

1,333,388.

Patented Mar. 9, 1920.

Inventor
William E. Chester
By
Attorneys.

UNITED STATES PATENT OFFICE.

WILLIAM E. CHESTER, OF NORWOOD, OHIO.

DENTAL DRILLING-TOOL.

1,333,388.            Specification of Letters Patent.        Patented Mar. 9, 1920.

Application filed June 27, 1917. Serial No. 177,172.

*To all whom it may concern:*

Be it known that I, WILLIAM E. CHESTER, a citizen of the United States, and a resident of Norwood, in the county of Hamilton and State of Ohio, have invented certain new and useful Improvements in Dental Drilling-Tools, of which the following is a full, clear, and exact description, reference being had to the accompanying drawing, forming part of this specification.

My invention relates to tools for use in drilling out cavities in tooth roots preparatory to the insertion therein of a crown retaining post. The post itself forms no part of this invention and is not illustrated in the drawings, the object of this invention being to provide a drill that will form in the root of a tooth, a drilled-out countersunk recess in the exposed end of the root, a drilled-out pulp canal extending inwardly from the root recess at the center of the recess, and when desired, a groove in the root around the walls of the countersunk recess.

A chief object of this invention is to provide a practical tool for this purpose which is adaptable for uses in many different cases by the simple interchange of parts, and thus avoid the necessity of the dentist's supplying himself with all possible sizes of complete tools. Another object is the provision of a removable trephine or hollow circular drill for the tool which can be put in place when it is desired to drill the outer groove in the case of the countersunk recess.

The said objects and other advantages to be noted I accomplish by that certain construction and arrangement of parts to be hereinafter more specifically pointed out and claimed.

In the drawing,

Fig. 7 is taken on the line 7, 7, of Fig. 6.

Figure 4:
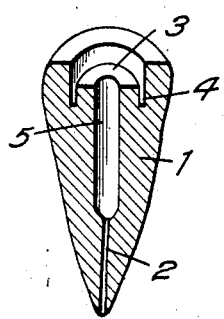
Fig. 4 is a longitudinal section through a root prepared by the use of the tool.

The form of the desired cavity to be prepared by the use of the tool is shown in Fig. 4, wherein the root 1 is shown having the pulp canal 2. In the outer end of the root is to be cut the countersunk recess 3, and around the walls of the recess the groove 4 is to be cut. From the center of the recess the pulp canal is to be drilled out as at 5. The tool so prepared may be used very advantageously in the mounting of a demountable post therein, said post to retain a crown. There are a number of ways in which such a recess can be used, one of them being to provide a post for the dentist corresponding to the size of tool or tool section used by him. This post will have a shoulder to fit the recess, and a central extension which will fit the drilled out pulp canal. The post may also have a flange around the periphery of its shoulder which will fit the groove around the countersunk recess.

It can be seen that a drilling tool that has all of its operations performed at one time, by united parts for the different cuttings, can easily drill out a cavity which will fit a properly selected post, and thus that the insertion of the post is not likely to injure the tooth root by splitting or the like.

Figure 7:
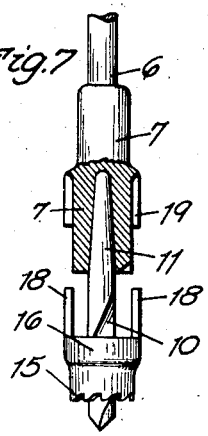

The tool comprises a shank 6, which in one form of the invention has its one end expanded as at 7 and cut on the end with cutting or drilling teeth 8. In this expanded end is formed a recess 9 for receiving a drill 10 for the root canal. This drill may be secured in the recess in any desired manner, such as, for example, it may be squared at its end 11, and the end 11 inserted in the recess and held with a small set screw 12. A mere tapered recess could be provided and the squared end made to a like taper (Fig. 7). The exact method is not essential. The shank and expanded end serve as a chuck to receive other tools as will be noted.

Figure 1:
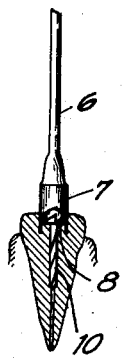
Figure 1 is a section taken through a tooth root showing the lower end of the drilling tool in section and the balance in elevation.
Figure 5:
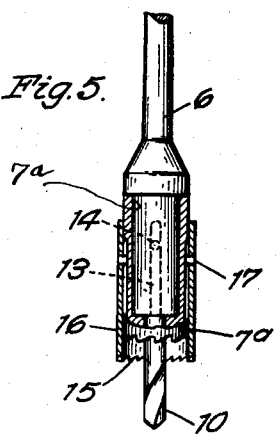
Fig. 5 is a longitudinal central section through a modified form of tool.
Figure 2:
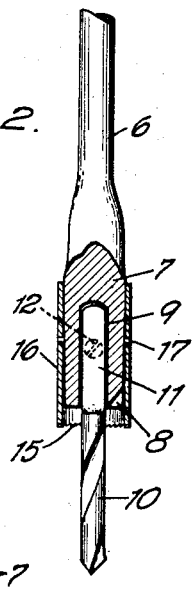
Fig. 2 is a central longitudinal section taken through the tool, on a larger scale, with the shank and inner drill in elevation.
Figure 3:
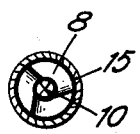
Fig. 3 is a bottom plan view of the tool.

If preferable to the dentist, the drill member 10 could be made integral with the shank (Fig. 5), and the recess drilling portion 7ª provided with a hollow center to fit over the drill 10 and snugly fit onto the shank 6. The shank could then be provided with a slot 13 to receive a pin 14 extending inwardly into the hollow bore of the said part 7ª.

The essential feature of the above structure is that the recess drilling portion and the pulp canal drilling portion are separable from each other and the dentist need provide himself with but one shank member with whichever part is integral with it, and can select the other of the two members which he may desire to use. The point which will determine the adjustment between the recess driller and the pulp canal driller will be the distance from the cutting edge of the recess driller to the point of the drill. It is according to this dimension that the post is to be selected. The drills which are separable should be marked with small numbers to correspond with the desired dimension of posts, to facilitate the selection.

Otherwise the selection of the proper post and tool depends on the nature of the work to be done, and it should not be understood that any one of my devices could be used for all possible cases. This could not be true, and the dentist employing my method of drilling teeth for artificial crowns will have to have several shank members of different sizes and the removable drill members in a more or less wide selection.

The cutting of the outer groove around the walls of the countersunk recess can be done with a removable tool so that when this is not desired by the dentist, he need not employ this section of the tool at all. The tool used resembles a trephine, in being a thin cylinder of metal having a toothed edge 15 and a body portion 16. It is to be slipped over the recess driller portion, and preferably has an inwardly extending pin or pins 17 that engage in grooves cut in the outer surface of the recess driller member.

I have found that there is no need of retaining the trephine against sliding endwise off the rest of the drill and that all that is necessary is to preserve it against rotation or tipping. Thus its fit on the shank of the recess driller should be close, and there should be a pin and slot connection of some kind.

Figure 6:
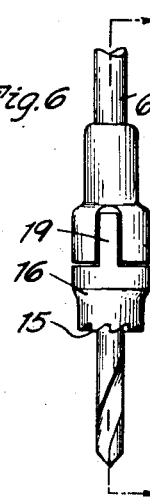
Figs. 6 and 7 are a side elevation, and a centrally broken away elevation from another side, of a third modification.

As shown in Fig. 6, the trephine is slipped on over the recess driller 7, 8, and held against rotation by means of extensions 18 that slide into shallow cuts 19 on the periphery of the said drill member, so as to be firmly clutched in place.

Having thus described my invention, what I claim as new and desire to secure by Letters Patent, is:—

1. A dental tool comprising essentially a chuck element, means on said chuck element for detachably securing thereto a pulp canal drilling member and additional means thereon for detachably securing thereto a recess drilling member simultaneously with the pulp canal drilling member.

2. A dental tool comprising a chuck element having a recess cutting member thereon, a pulp canal drilling member thereon, and a trephine member thereon, two of these members at least being demountably secured to the chuck element, and means for holding them in fixed relation to each other on the chuck element, whereby operation of the element will operate said members simultaneously.

3. A dental drilling tool for drilling out tooth roots comprising a tool for cutting a countersunk recess in the head of a root, and for simultaneously drilling out the pulp canal thereof, a small trephine of a size to fit closely around the recess cutting portion of the tool, and means for retaining said trephine against rotation on said portion, for the purpose described.

WILLIAM E. CHESTER.